United States Patent [19]

Moon

[11] Patent Number: 5,516,019

[45] Date of Patent: May 14, 1996

[54] CARRIER

[76] Inventor: Soo M. Moon, 101, Ihwavilla, 986-1, Mansu-ldong, Namdong-Ku, Inchon, Rep. of Korea

[21] Appl. No.: 402,114

[22] Filed: Mar. 10, 1995

[30] Foreign Application Priority Data

May 16, 1994 [KR] Rep. of Korea ...................... 94-10808
May 16, 1994 [KR] Rep. of Korea ...................... 94-10809

[51] Int. Cl.⁶ .................................................. B60R 9/048
[52] U.S. Cl. .......................... 224/324; 224/309; 224/315; 224/917.5; 248/206.5; 248/205.8; 248/205.5
[58] Field of Search .................... 224/917.5, 309, 224/315, 324, 327, 319, 322, 323, 325, 326; 248/206.5, 205.8, 205.5, 205.6, 205.7, 363, 467

[56] References Cited

U.S. PATENT DOCUMENTS

| | | | |
|---|---|---|---|
| 4,225,069 | 9/1980 | Breitschwerdt et al. | 224/319 |
| 4,312,467 | 1/1982 | Kulwin | 224/917.5 |
| 5,192,043 | 3/1993 | Fa | 248/363 |
| 5,423,466 | 6/1995 | Moon | 224/324 |
| 5,460,310 | 10/1995 | Corsarini | 224/315 |

FOREIGN PATENT DOCUMENTS

| | | | |
|---|---|---|---|
| 3514129 | 10/1986 | Germany | 224/309 |
| 54-15952 | 2/1979 | Japan . | |
| 57-202356 | 12/1982 | Japan . | |
| 62-268751 | 11/1987 | Japan . | |
| 64-11856 | 1/1989 | Japan . | |

OTHER PUBLICATIONS

Korean Utility Model Publication No. 1510 Published Oct. 21, 1991; Publication No.: 91–8481; Inventor: Moon.

Primary Examiner—Henry J. Recla
Assistant Examiner—Gregory M. Vidovich
Attorney, Agent, or Firm—Hedman, Gibson & Costigan

[57] ABSTRACT

A carrier includes a fixing member having a fixing plate and a rubber magnet plate attached underneath the fixing plate, a carrier main body having ski mounting recesses and a shaft insertion hole, and a vacuum adhesion member having a shaft for lifting the vacuum adhesion member. The shaft of the vacuum adhesion member is protruded through the shaft insertion hole of the carrier main body, and a lever for lifting the shaft is installed at a top of the shaft of the vacuum adhesion member protruding through the shaft insertion hole. A ski fixing plate and inner cover having side cover lips for confining the lever of the vacuum adhesion member and an outer cover having a pressing member are rotatably connected to the carrier main body.

2 Claims, 6 Drawing Sheets

CARRIER

BACKGROUND OF THE INVENTION

1. Field of the Invention

This invention relates to a carrier mounted on a roof of a car for carrying a ski and/or a snow board etc., and, more particularly, to a carrier having a rubber magnet plate and a vacuum adhesion plate combined with each other.

2. Description of the Prior Art

Japanese Utility Model Applications Laid-open Sho 54-15952, Sho 57-202356 and Sho 64-11856 disclose carriers mounted on a roof of a car for carrying long objects such as ski.

These conventional carriers include a supporting member having fixing means at one side thereof for fastening to a rain gutter or a side sill of the car, a vacuum adhesion plate at the other side thereof which is adhered to the roof of the car, and ski mounting grooves formed on the top of the supporting member. A band is hooked on the supporting member or a cover is rotatably installed on the supporting member. However, it is inconvenient to mount and remove these carriers. The car driving with empty carriers mounted on it because it is inconvenient to remove these carriers does not look smart, and ski carried on these carriers are apt to be stolen.

The aforementioned inconvenience in mounting and removing the carriers is solved by another carrier disclosed in Japanese Patent Application Laid-open Sho 62-268751. This carrier includes a dome-typed casing and a vacuum plate. The casing has a ski recess formed at the top thereof, a penetration hole, and a wall having a lower end. The vacuum plate has a shaft and a magnet within the vacuum plate. The peripheral portion of the vacuum plate is pressed by the lower end of the wall of the dome-typed casing. The shaft of the vacuum plate is inserted through the penetration hole, and a lever for fastening or releasing the carrier is installed at the protruding top of the shaft. Ski are inserted in the recess of the dome-typed casing and bound with bands. While this carrier is advantageous in that it is easy to mount/remove the carrier on/from the car, a problem exists in that, because the lever is exposed, vacuum state under the vacuum adherent plate can be removed easily thus making it difficult to keep the ski and carrier itself from being stolen.

In addition, the aforementioned carriers have ski recesses formed on the supporting body or on the casing which is adequate for ski but not for equipments of bigger width, e.g., snow board.

SUMMARY OF THE INVENTION

An object of the present invention is to solve the aforementioned problems and to provide a carrier which can be mounted on the roof of a car firmly, can be removed easily, and is capable of carrying the ski and the snow board etc. wider than the ski.

Another object of the present invention is to provide a carrier which is not removed unintentionally even when moisture surrounding a rubber magnet plate of the carrier froze.

These and other objects and advantages of the present invention will become evident from the description which follows.

According to the invention, a carrier comprising a fixing member having a fixing plate and a rubber magnet plate attached underneath the fixing plate; a carrier main body including two ski mounting recesses formed at both sides thereof and a shaft insertion hole, the carrier main body being fixed on the fixing member; a vacuum adhesion means including a shaft, the vacuum adhesion means being positioned at a central portion of the fixing member and fine shaft of the vacuum adhesion means protruding through the shaft insertion hole of the carrier main body, and a lever installed at a top of the shaft of the vacuum adhesion means protruding through the shaft insertion hole; a ski fixing plate and inner cover having side cover lips for confining the lever and another ski mounting recess, the ski fixing plate being rotatably connected to the carrier main body; and an outer cover having a pressing member, the outer cover being rotatably connected to the carrier main body is provided.

In one embodiment, the carrier further comprises external sealing means having inner and outer seals, the external sealing means being installed at a lower end of an outer periphery of the carrier main body; and internal sealing means having a seal integrally formed on the vacuum adhesion means and a seal pressing plate formed on the carrier main body for making the seal adhered to the fixing plate.

Preferred embodiments of the carrier will now be explained with reference to the accompanying drawings. As various changes might be made by persons skilled in the art, the invention is not intended to be limited to the embodiments illustrated.

BRIEF DESCRIPTION OF THE PREFERRED EMBODIMENT

Figure 1:
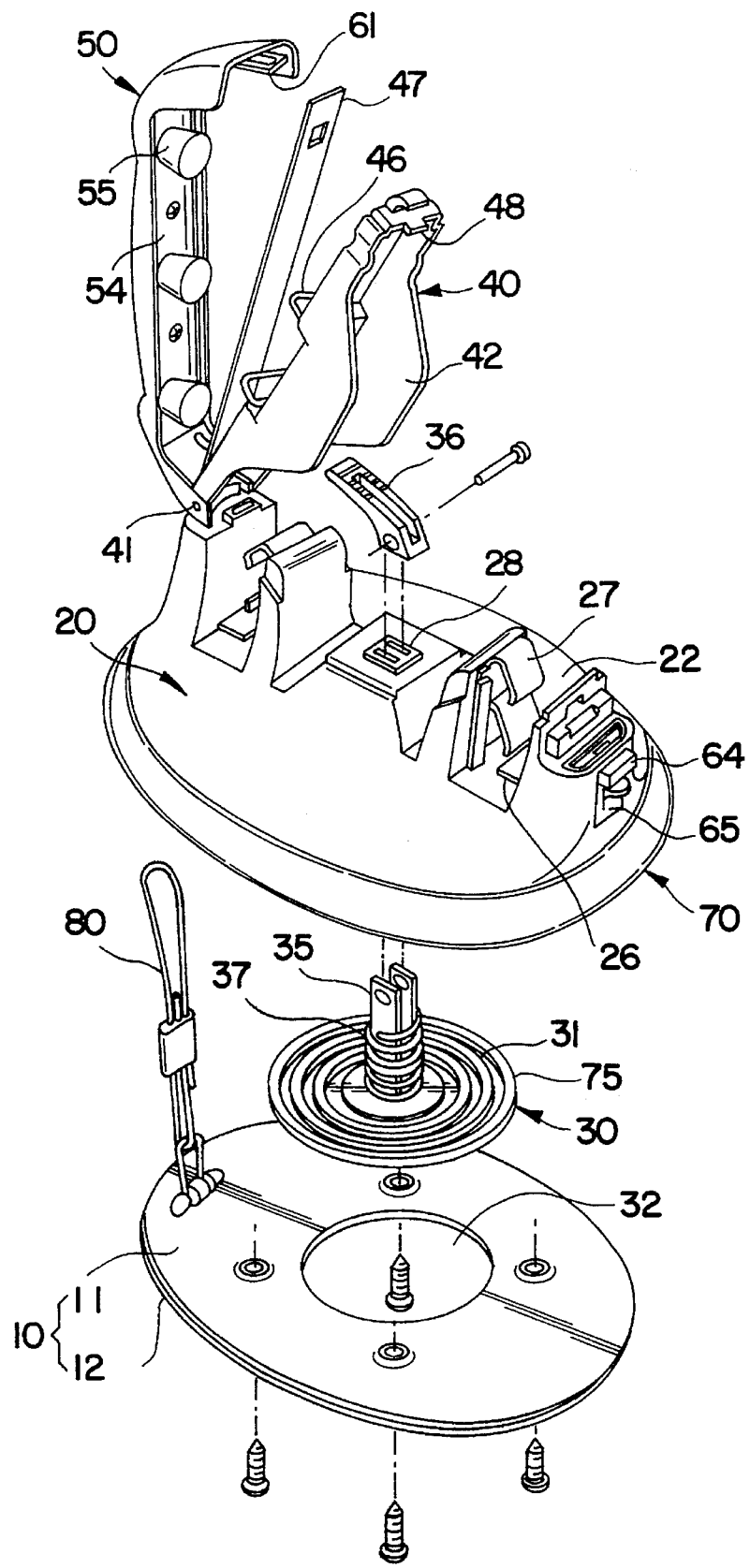
FIG. 1 is an exploded perspective view of the carrier according to an embodiment of the invention.
Figure 2:
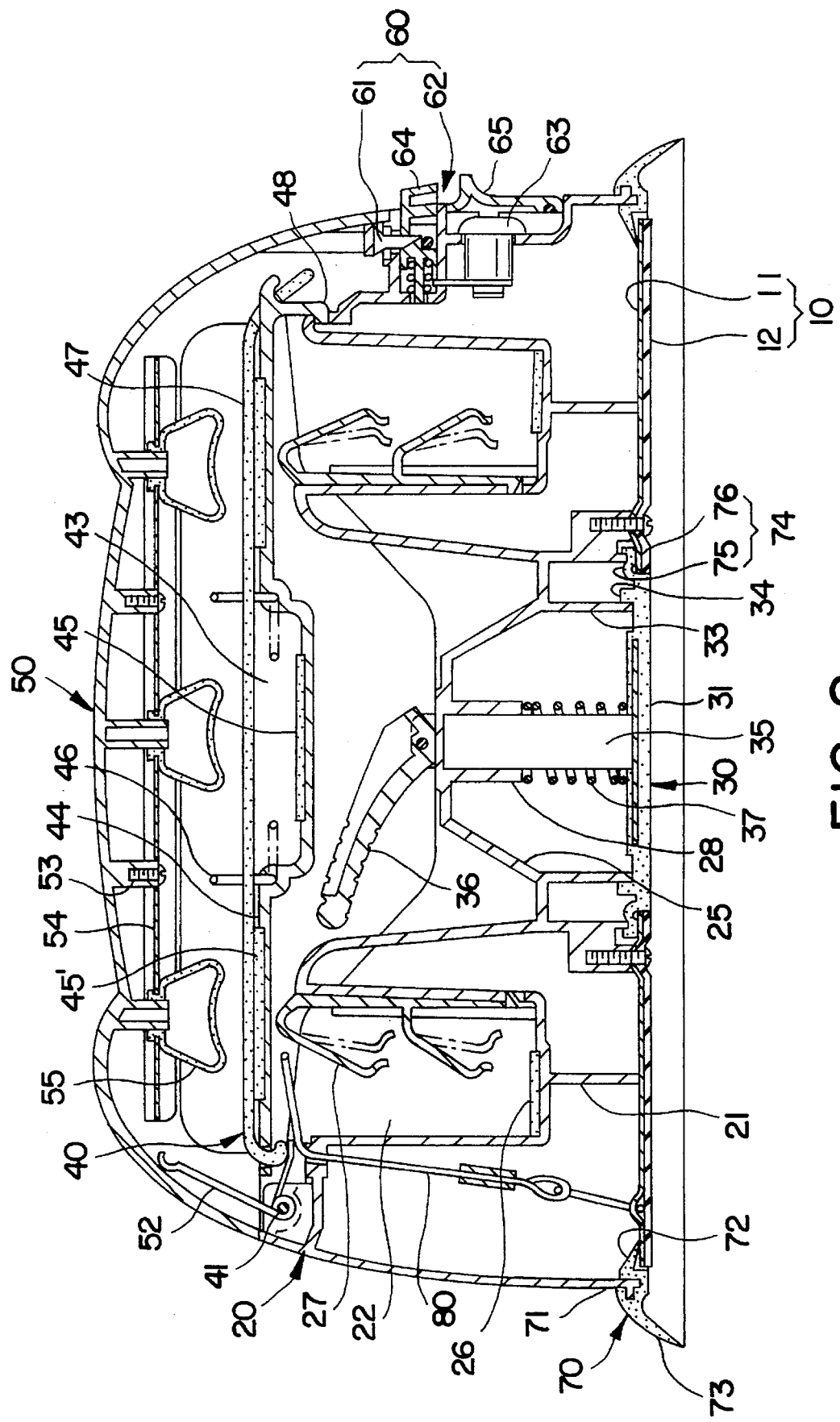
FIG. 2 is a longitudinal cross sectional view of the carrier of FIG. 1.

As shown in FIGS. 1 and 2, a carrier according to an embodiment of the present invention has a fixing member 10 which can be mounted on a roof of a car, a carrier main body 20 fastened on fixing member 10, a vacuum adhesion means 30 installed at a central portion of fixing member 10 and at a shaft insertion hole of carrier main body 20, a ski fixing plate and inner cover 40 which is rotatably connected to carrier main body 20, an outer cover 50 which together with ski fixing plate and inner cover 40 is rotatably connected to a side of carrier main body 20, and a locking means 60 for locking outer cover 50 to carrier main body 20.

Fixing member 10 has a fixing plate 11 made of synthetic resin or metal and a rubber magnet plate 12 attached underneath fixing plate 11. An insertion opening 32 through which a vacuum adhesion plate 31 (described later) whose diameter is slightly larger than insertion opening 32 is inserted is formed on a central portion of fixing member 10.

Carrier main body 20 fixed on fixing member 10 by screws has a supporting plate 21 adhered on fixing plate 11, two ski mounting recesses 22 formed on the top of supporting plate 21, a mount 25 for vacuum adhesion means 30 formed between two ski mounting recesses 22, and a locking device 62. Pads 26 are attached on the bottom of recesses 22, and elastic clips 27 are provided on a lateral face of recesses 22.

A cylindrical pressing plate 33 is protruded underneath mount 25 of carrier main body 20. Vacuum adhesion means 30 has a vacuum adhesion plate 31 which is installed at insertion opening 32, a circular supporting rim 34 formed on vacuum adhesion plate 31, which abuts on an outer periphery of pressing plate 33 of carrier main body 20, a shaft 35 which is attached vertically to vacuum adhesion plate 31 and extended upward through an insertion hole 28 formed on mount 25 of carrier main body 20, and a lever 36 rotatively connected to the top of shaft 35. When shaft 35 attached to the central portion of vacuum adhesion plate 31 is lifted using lever 36, the outer periphery portion of vacuum adhesion plate 31 pressed by pressing plate 33 is supported on the roof of the car, and the central portion of vacuum adhesion plate 31 is lifted to create vacuum state. A coil spring 37 is inserted on shaft 35 between an upper face of vacuum adhesion plate 31 and insertion hole 28.

Ski fixing plate and inner cover 40 is hinged on one side of carrier main body 20 by a pin 41. And, ski fixing plate and inner cover 40 has an engaging jaw 48 formed at the other side, side cover lips 42 for covering ski mounting recesses 22 and confining lever 36, a ski mounting recess 43 and ski mounting parts 44 formed at the central portion and the side portions thereof, respectively, pads 45 and 45' installed on ski mounting recess 43 and ski mounting parts 44, pressing segments 46 installed on both side cover lips of ski mounting recess 43, and an elastic band 47.

Outer cover 50 together with ski fixing plate and inner cover 40 is hinged on one side of carrier main body 20 by pin 41. A coil spring 52 is installed around pin 41 to maintain outer cover 50 opened when outer cover 50 is opened. Outer cover 50 has an attaching plate 54 fixed at protrusions 53 formed on an inner wall and pressing members 55 attached on attaching plate 54.

Locking means 60 has an engaging part 61 formed at the other side of outer cover 50 and locking device 62 installed on carrier main body 20. Locking device 62 has a lock 63 and a latch 64, and a protecting cover 65 is provided outside lock 63 to keep snow or rain from getting inside.

The carrier according to the invention has external sealing means 70 and internal sealing means 74.

Figure 4:
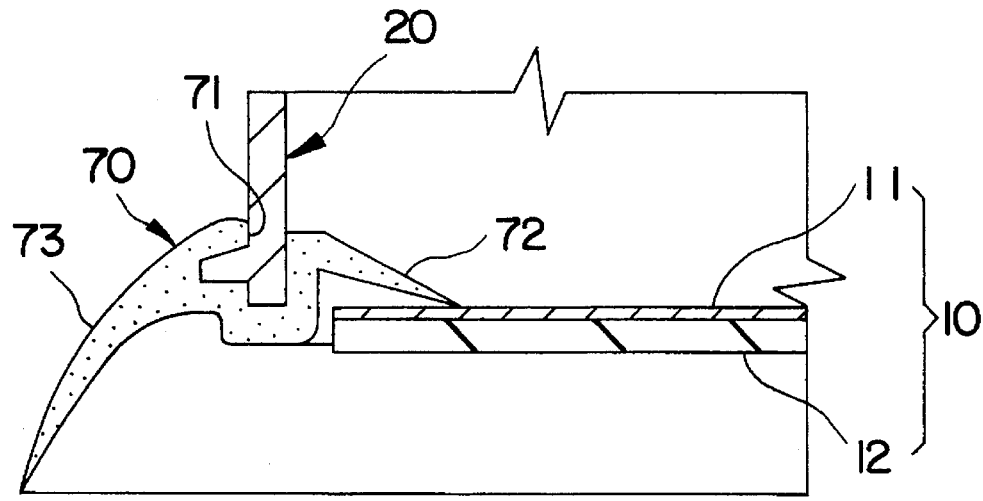
FIG. 4 is an enlarged sectional view of external seal means of the carrier of FIG. 1.

Referring to FIG. 4, external sealing means 70 has a groove 71 to which a lower end of the outer periphery portion of carrier main body 20 is inserted, an inner seal 72 which covers an upper surface of fixing plate 11, and an outer seal 73 which keeps moisture from permeating between the roof of the car and outer periphery of fixing plate 11.

Figure 5:
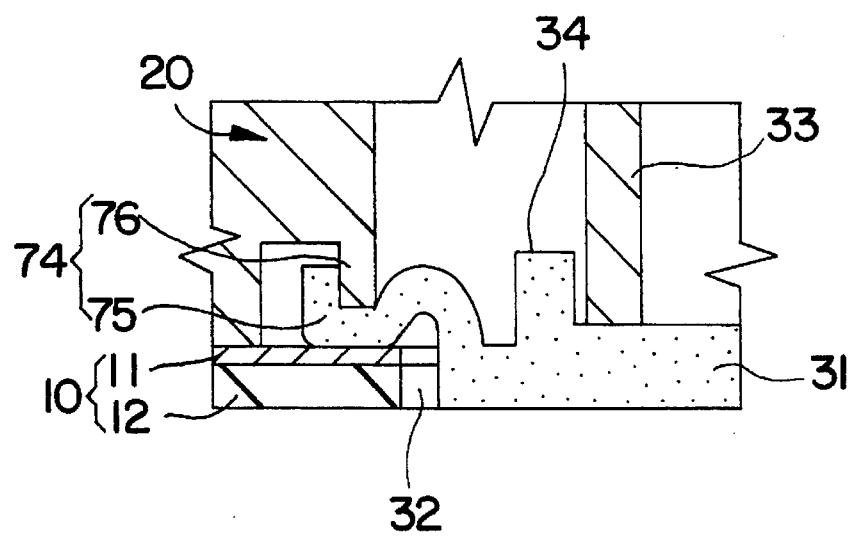
FIG. 5 is an enlarged sectional view of internal seal means of the carrier of FIG. 1.

Referring to FIG. 5, internal sealing means 74 has a seal 75 integrally formed on an outer periphery portion of vacuum adhesion plate 31 to cover insertion opening 32 formed at the central portion of fixing plate 11 and a seal pressing plate 76 formed on carrier main body 20 to make seal 75 adhered to fixing plate 11.

A reference numeral 80 denotes a separating grip.

Figure 3A:
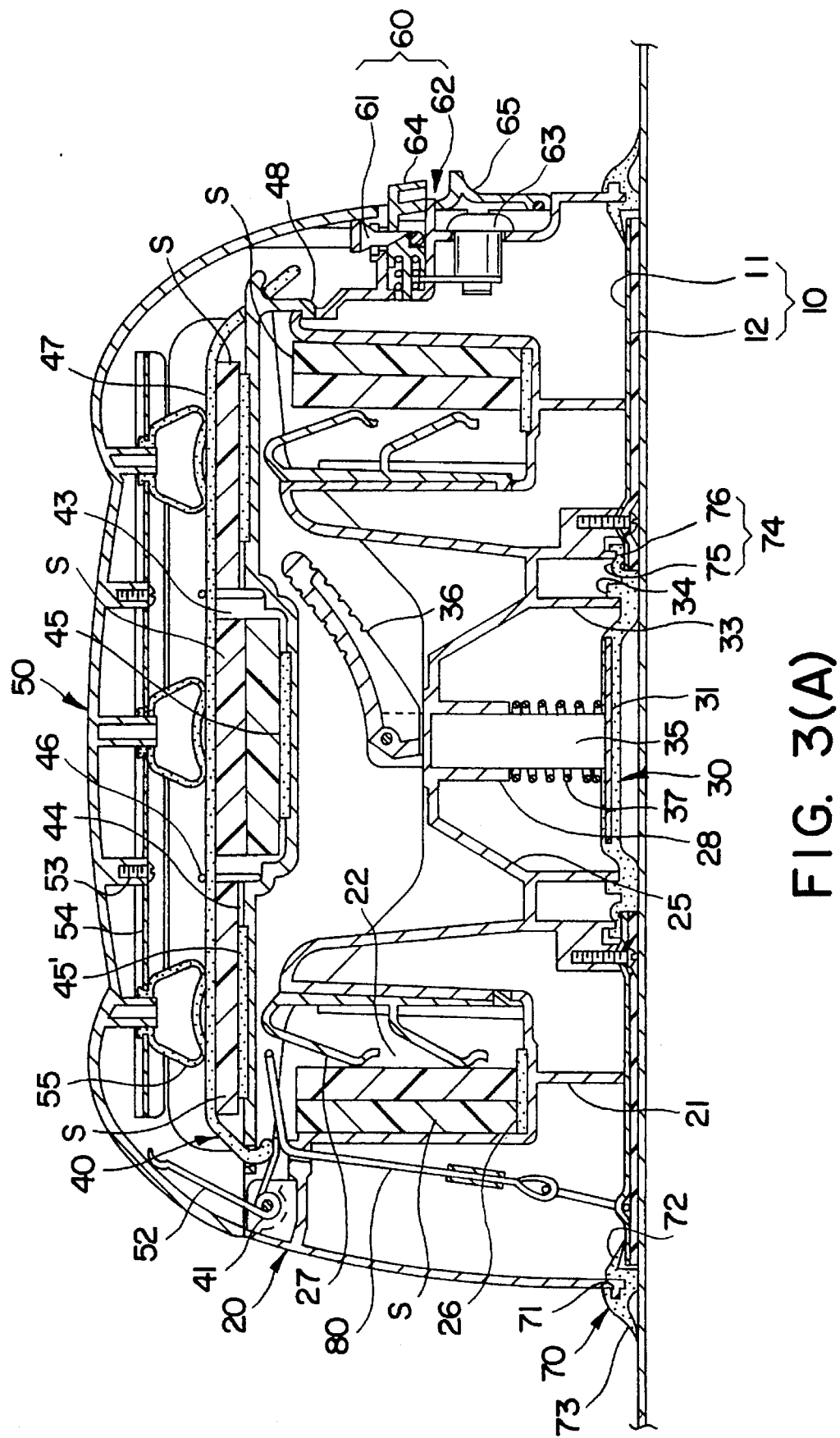
FIG. 3(A) is a longitudinal cross sectional view of the carrier of FIG. 1 carrying ski only.

To mount the carrier according to the invention on the car, outer cover 50 and ski fixing plate and inner cover 40 are opened, first, and the carrier is placed on the roof of the car. Then rubber magnet plate 12 attached to fixing plate 11 is adhered on the roof by magnetic attraction. At this state, lever 36 can be rotated to a position as shown in FIG. 3(A) to lift shaft 35 and thus lift the central portion of vacuum adhesion plate 31 attached to a lower end of shaft 35 making the bottom of vacuum adhesion plate 31 concave and vacuum adhesion plate 31 adhered on the roof by a vacuum force.

Because the carrier according to the invention can be adhered on the roof of the car firmly by the magnetic attraction of rubber magnet plate 12 attached to fixing plate 11 and a vacuum action of vacuum adhesion plate 31, the carrier is not separated by vibration or impact caused during driving the car. Also, because fixing plate 11 made of metal is attached on rubber magnet plate 12, it is difficult to insert a screw driver, e.g., between rubber magnet plate 12 and the roof, and, even though the screw driver is inserted, it will not reach to vacuum adhesion plate 31 such that it is impossible to remove the carrier without releasing the vacuum state under vacuum adhesion plate 31.

By this manner, a set of carriers are mounted at front and rear on the roof of the car. A set of ski S can be inserted at ski mounting recesses 22 formed on carrier main body 20 and supported by elastic clips 27. After separating elastic band 47 from ski fixing plate and inner cover 40, engaging jaw 48 formed at the other end of ski fixing plate and inner cover 40 is hooked on carrier main body 20 to cover an upper surface of mount 25 for vacuum adhesion means 30 with side cover lips 42. Another set of ski S are inserted at ski mounting recess 43 formed at the center of ski fixing plate and inner cover 40, and still another set of ski S are put on ski mounting parts 44 formed at both sides of ski mounting recess 43. Then elastic band 47 is hooked and outer cover 50 is closed to press elastic band 47 by which ski S inserted at ski mounting recess 43 or put on ski mounting parts 44 are bound with pressing members 55 and support ski S (See FIG. 3(A)).

Figure 3B:
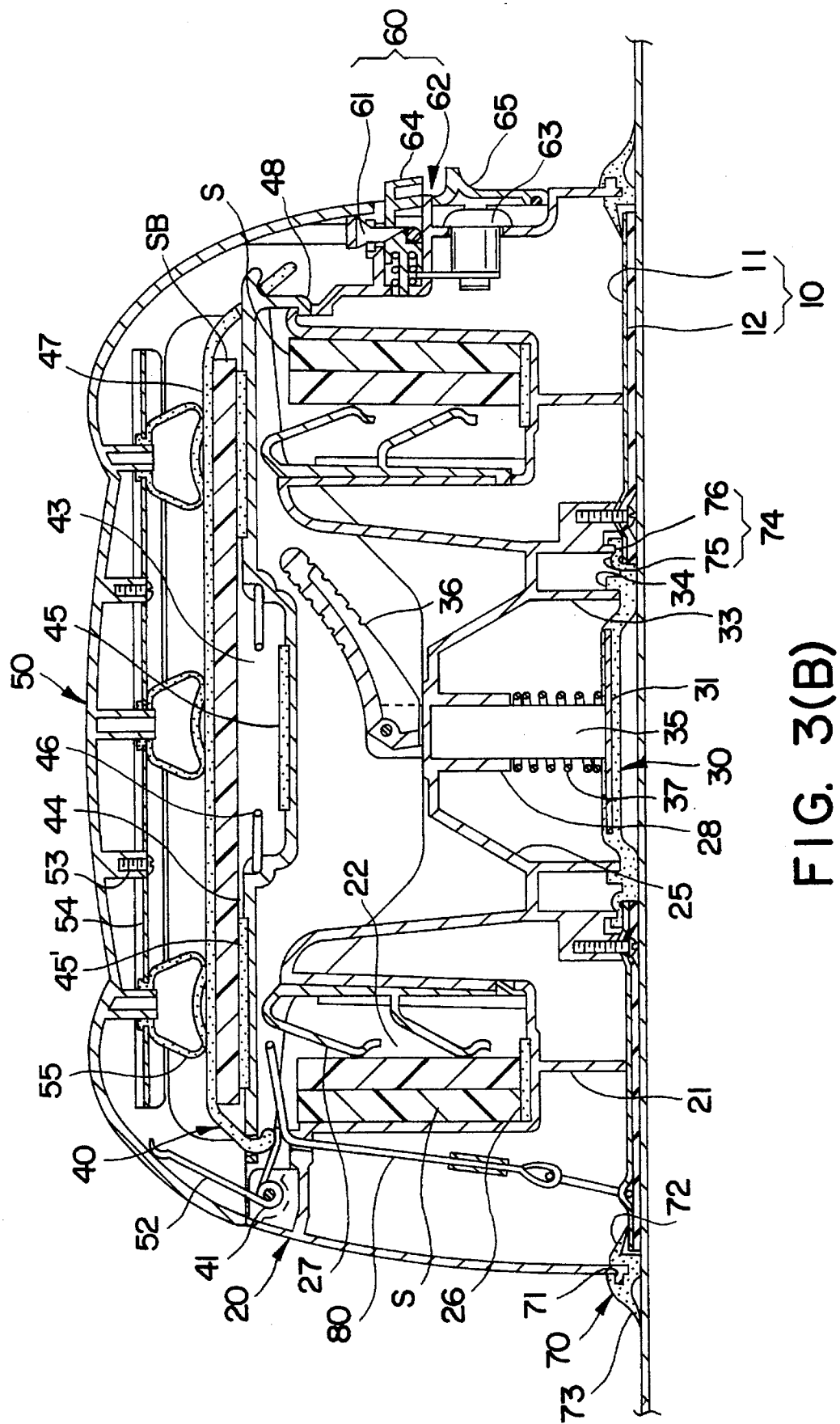
FIG. 3(B) is a longitudinal cross sectional view of the carrier of FIG. 1 carrying ski and a snow board together.

Also, after inserting or without inserting ski S to ski mounting recesses 22 formed on carrier main body 20 and hooking engaging jaw 48 of ski fixing plate and inner cover 40 on carrier main body 20, pressing segments 46 at both side of ski mounting recess 43 are folded to mount a snow board SB wider than ski on ski fixing plate and inner cover 40. Then elastic band 47 is hooked and outer cover 50 is closed to press elastic band 47 by which snow board SB is bound with pressing members 55 and support snow beard SB (See FIG. 3(B)). Locking device 62 installed on carrier main body 20 is locked by inserting and turning a key counter clockwise to engage latch 64 to engaging part 61, and thus outer cover 50 can not be opened arbitrary. Because lever 36 is confined by side cover lips 42 formed on ski fixing plate and inner cover 40 and thus not exposed, lever 36 can not be turned down arbitrary to remove the carrier such that the carrier and the ski can not be stolen.

Figure 6:
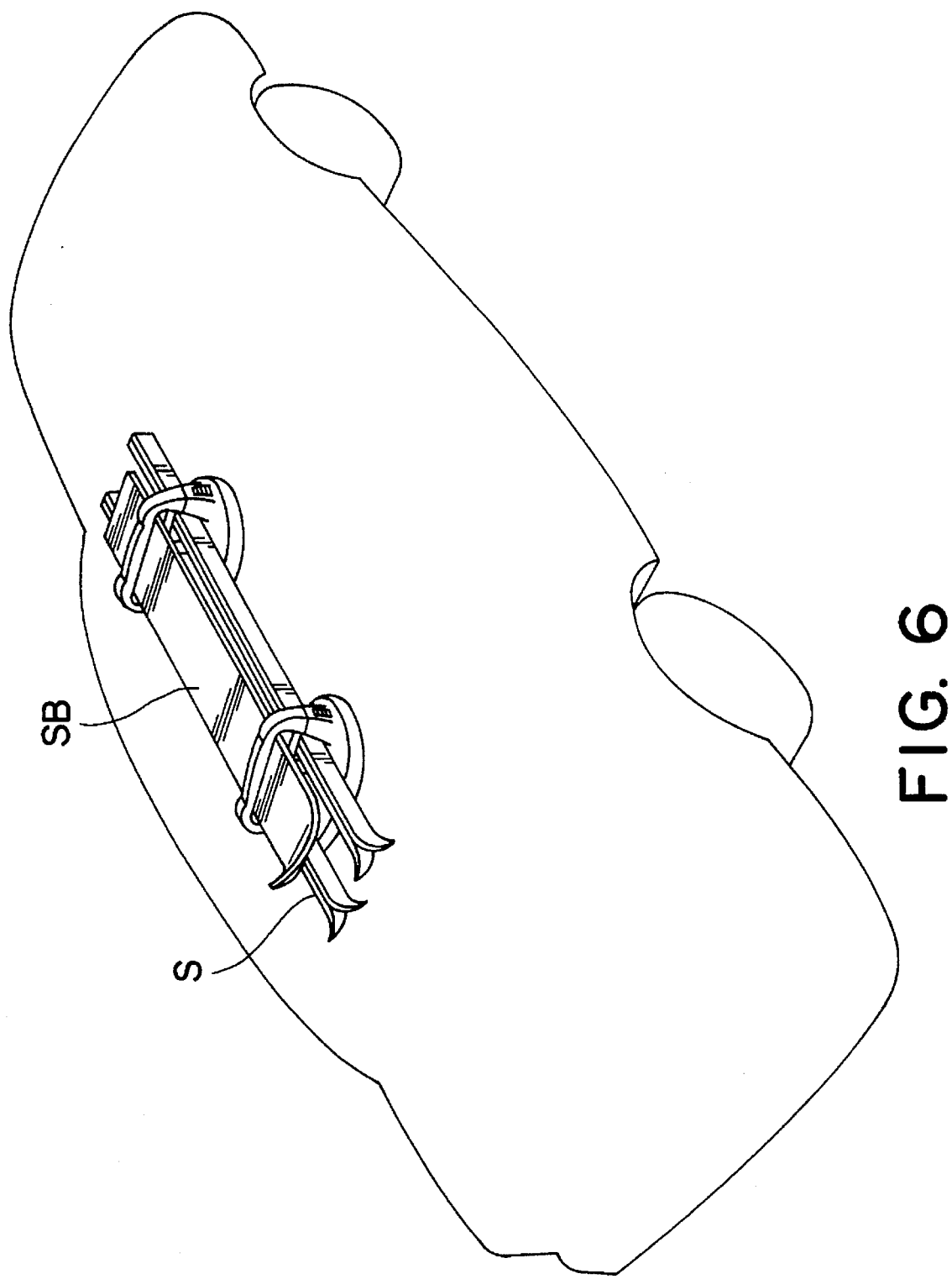
FIG. 6 is a perspective view showing carriers mounted on a roof of a car.

FIG. 6 illustrates a state ski S and snow board SB are mounted on the roof of the car.

Removal of the ski from the carrier can be done by following a process contrary to the mounting process.

The vibration or impact caused during driving the car with ski mounted on the carrier is absorbed by rubber magnet plate 12 and vacuum adhesion plate 31 primarily and then by coil spring 37 installed on shaft 35 between vacuum adhesion plate 31 and insertion hole 28 again such that the vibration or impact is not transmitted to carrier main body 20 and ski directly, and, therefore, ski S are not subject to damage.

To remove the carrier from the car, locking means 60 is released and lever 36 is turned down at a state where ski fixing plate and inner cover 40 is opened to lower shaft 35 such that vacuum adhesion plate 31 may reach to a state as shown in FIG. 2. Then separating grip 80 is lifted slightly to raise fixing plate 11 and, also, one side portion of vacuum adhesion plate 31 which is connected to fixing plate 11 by internal sealing means 74 thus making air enter through the side portion and release the vacuum state, and, accordingly, the carrier can be separated easily.

When it rained or snowed on the carrier mounted on the roof of the car, permeation of moisture from outside at underneath rubber magnet plate 12 is protected by outer seal 73 of external sealing means 70 which is installed at the lower end of outer periphery portion of carrier main body 20. Also, permeation of moisture formed by condensation inside of carrier main body 20 between the roof of the car and rubber magnet plate 12 is protected by seal 75 of internal sealing means 74 which covers insertion opening 28 of fixing plate and by inner seal 72 of external sealing means 70 which covers outer peripheral edge portion of fixing plate 11. Thus the problem of conventional art that the moisture inside or outside of the rubber magnet plate freeze and expand when ambient temperature is decreased suddenly and that the carrier is separated from the roof of the car unintentionally is solved according to the present invention.

The carrier according to the invention as described above can be removed without damaging the roof of the car when it is not used, and the carrier can be mounted on the roof firmly by combining the vacuum adhesion plate and the rubber magnet plate.

Also, not only one set of the carriers can carry at least four sets of ski but also the snow board wider than the ski can be carried, and it is convenient to carry the ski and the snow board. Because the carrier is water sealed, even though the moisture inside or outside of the rubber magnet plate freeze when ambient temperature is decreased suddenly after it rained or snowed in a winter time, an adhering ability of the rubber magnet plate is not deteriorated and the carrier is not separated unintentionally such that there are advantages of carrying the ski etc. safely.

What is claimed is:

1. A carrier comprising:

a fixing member having a fixing plate and a rubber magnet plate attached underneath the fixing plate;

a carrier main body including two ski mounting recesses formed at both sides thereof and a shaft insertion hole extending therethrough, the carrier main body being fixed on the fixing member;

a vacuum adhesion means including a shaft, the vacuum adhesion means being positioned at a central portion of the fixing member and the shaft of the vacuum adhesion means protruding through the shaft insertion hole of the carrier main body, and a lever installed at a top of the shaft of the vacuum adhesion means protruding through the shaft insertion hole for operation of said vacuum adhesion means;

a ski fixing plate and inner cover having another ski mounting recess and side cover lips for confining the lever and for covering said two ski mounting recesses, the ski fixing plate and inner cover being rotatably connected to the carrier main body; and an outer cover having a pressing member, the outer cover being rotatably connected to the carrier main body such that the outer cover is adapted to overly said ski fixing plate and inner cover and cover said another ski mounting recess.

2. The carrier as claimed in claim 1 further comprising external sealing means having inner and outer seals, the external sealing means being installed at a lower end of an outer periphery of the carrier main body; and internal sealing means having a seal integrally formed on the vacuum adhesion means and a seal pressing plate formed on the carrier main body for making the seal adhered to the fixing plate.

\* \* \* \* \*